(12) United States Patent
Kolb

(10) Patent No.: US 9,802,520 B2
(45) Date of Patent: Oct. 31, 2017

(54) VEHICLE SEAT HAVING A HORIZONTALLY MOVABLE SEATING SURFACE FOR RECEIVING A PERSON

(71) Applicant: GRAMMER AG, Amberg (DE)

(72) Inventor: Jens Kolb, Koenigstein (DE)

(73) Assignee: GRAMMER AG, Amberg (DE)

( * ) Notice: Subject to any disclaimer, the term of this patent is extended or adjusted under 35 U.S.C. 154(b) by 210 days.

(21) Appl. No.: 14/568,374

(22) Filed: Dec. 12, 2014

(65) Prior Publication Data

US 2015/0165933 A1 Jun. 18, 2015

(30) Foreign Application Priority Data

Dec. 16, 2013 (DE) ......................... 10 2013 021 561

(51) Int. Cl.
*B60N 2/50* (2006.01)
*B60N 2/52* (2006.01)

(52) U.S. Cl.
CPC ............. *B60N 2/502* (2013.01); *B60N 2/508* (2013.01); *B60N 2/525* (2013.01)

(58) Field of Classification Search
CPC ......... B60N 2/502; B60N 2/508; B60N 2/525
USPC ....................................... 297/344.16, 344.19
See application file for complete search history.

(56) References Cited

U.S. PATENT DOCUMENTS

| | | | |
|---|---|---|---|
| 1,908,902 A | 5/1933 | Knoll | |
| 2,346,895 A | 4/1944 | Bergman | |
| 2,660,222 A | 11/1953 | Woodsworth | |
| 2,725,078 A | 11/1955 | Glancy | |
| 3,148,869 A | 9/1964 | Peterson | |
| 3,269,774 A | 8/1966 | Friedhelm | |
| 3,470,692 A | 10/1969 | Kamp | |
| 3,480,293 A | 11/1969 | Vogel et al. | |
| 3,596,895 A | 8/1971 | Hirtreiter | |
| 3,732,944 A | 5/1973 | Kendall | |
| 3,806,191 A | 4/1974 | Stegmaier | |
| 3,938,770 A | 2/1976 | Turner et al. | |
| 4,087,069 A | 5/1978 | Hall et al. | |
| 4,139,186 A | 2/1979 | Postema et al. | |

(Continued)

FOREIGN PATENT DOCUMENTS

| CH | 138281 | 2/1930 |
|---|---|---|
| CN | 101337518 | 1/2009 |

(Continued)

OTHER PUBLICATIONS

Official Action (no English translation available) for German Patent Application No. 102013110370.7 dated Feb. 20, 2014, 3 pages.

(Continued)

*Primary Examiner* — Anthony D Barfield
(74) *Attorney, Agent, or Firm* — Sheridan Ross PC

(57) ABSTRACT

The invention relates to a vehicle seat with a horizontally movable seating surface for receiving a person, a retaining means which can be rigidly connected to a vehicle, and a horizontal spring system and a vertical spring system, wherein both the horizontal and vertical spring systems are configured as fluid systems, wherein the fluid systems are supplied by a central fluid supply and the fluid system of the horizontal spring system being separated from the fluid system of the vertical spring system by at least one valve.

16 Claims, 4 Drawing Sheets

(56) References Cited

U.S. PATENT DOCUMENTS

| | | |
|---|---|---|
| 4,418,955 A | 12/1983 | Muncke et al. |
| 4,497,078 A | 2/1985 | Vogel et al. |
| 4,502,673 A | 3/1985 | Clark |
| 4,526,258 A | 7/1985 | Huber |
| 4,531,761 A | 7/1985 | von Sivers |
| 4,655,440 A | 4/1987 | Eckert |
| 4,733,847 A | 3/1988 | Grassl |
| 4,743,000 A | 5/1988 | Karnopp |
| 4,936,423 A | 6/1990 | Karnopp |
| 5,169,112 A | 12/1992 | Boyles et al. |
| 5,222,759 A | 6/1993 | Wanner et al. |
| 5,263,559 A | 11/1993 | Mettner |
| 5,273,240 A | 12/1993 | Sharon |
| 5,290,089 A | 3/1994 | Oleszko et al. |
| 5,294,085 A | 3/1994 | Lloyd et al. |
| 5,538,117 A | 7/1996 | Bouchez |
| 5,685,603 A | 11/1997 | Lane, Jr. |
| 5,836,647 A | 11/1998 | Turman |
| 5,871,257 A | 2/1999 | Dundes, Sr. |
| 5,876,085 A | 3/1999 | Hill |
| 6,120,082 A | 9/2000 | Vandermolen |
| 6,467,748 B1 | 10/2002 | Schick et al. |
| 6,494,441 B2 | 12/2002 | Beck et al. |
| 6,857,674 B2 | 2/2005 | Chareyre |
| 7,246,836 B2 | 7/2007 | Hahn |
| 7,290,834 B2 * | 11/2007 | Christopher ............ B60N 2/02 297/344.16 X |
| 7,341,645 B2 | 3/2008 | Fong |
| 7,568,675 B2 | 8/2009 | Catton |
| 7,635,051 B2 | 12/2009 | Beck |
| 7,699,147 B2 | 4/2010 | Preukschat et al. |
| 7,779,974 B2 | 8/2010 | Timoney et al. |
| 8,091,964 B2 | 1/2012 | Carter et al. |
| 8,112,198 B2 | 2/2012 | Parison, Jr. et al. |
| 8,118,287 B2 | 2/2012 | Schordine |
| 8,146,897 B2 | 4/2012 | Beck |
| 8,256,842 B2 * | 9/2012 | Himmelhuber ........ B60N 2/002 297/344.16 X |
| 8,342,541 B2 | 1/2013 | Wurmthaler et al. |
| 8,439,420 B2 | 5/2013 | Cantor et al. |
| 8,585,004 B1 | 11/2013 | Roeglin et al. |
| 8,632,061 B2 | 1/2014 | Nemoto |
| 8,776,961 B2 | 7/2014 | Mori et al. |
| 8,820,064 B2 | 9/2014 | Six et al. |
| 8,998,325 B2 | 4/2015 | Jonsson |
| 9,120,410 B2 | 9/2015 | Bauman |
| 9,140,328 B2 | 9/2015 | Lorey |
| 9,260,011 B2 | 2/2016 | Anderson et al. |
| 9,266,453 B2 | 2/2016 | Haller et al. |
| 9,481,221 B2 | 11/2016 | Reybrouck |
| 9,597,939 B2 | 3/2017 | Anderson et al. |
| 2001/0015565 A1 | 8/2001 | Motozawa et al. |
| 2001/0033047 A1 | 10/2001 | Beck et al. |
| 2002/0145315 A1 | 10/2002 | Fraley et al. |
| 2004/0112659 A1 | 6/2004 | Kramer et al. |
| 2004/0251097 A1 | 12/2004 | Barbison et al. |
| 2006/0237885 A1 | 10/2006 | Paillard et al. |
| 2007/0035167 A1 | 2/2007 | Meyer |
| 2007/0084687 A1 | 4/2007 | Foster et al. |
| 2007/0278377 A1 | 12/2007 | Moorehouse et al. |
| 2008/0156602 A1 | 7/2008 | Hiemenz et al. |
| 2009/0015051 A1 * | 1/2009 | Haeberle ................ A47C 3/30 297/344.19 |
| 2009/0134595 A1 | 5/2009 | Haller et al. |
| 2009/0218867 A1 | 9/2009 | Clark |
| 2010/0072760 A1 | 3/2010 | Anderson et al. |
| 2010/0117411 A1 | 5/2010 | Fujita et al. |
| 2010/0181708 A1 | 7/2010 | Kolb et al. |
| 2010/0276959 A1 | 11/2010 | Jang |
| 2011/0001342 A1 | 1/2011 | Deml et al. |
| 2011/0006567 A1 | 1/2011 | Mullen |
| 2011/0018316 A1 | 1/2011 | Meredith et al. |
| 2011/0277433 A1 | 11/2011 | Sugden et al. |
| 2011/0278894 A1 | 11/2011 | Lorey |
| 2011/0298266 A1 | 12/2011 | Haller |
| 2012/0007293 A1 | 1/2012 | Bauer et al. |
| 2012/0025577 A1 | 2/2012 | Kolb |
| 2012/0091679 A1 | 4/2012 | Kashi et al. |
| 2012/0091773 A1 | 4/2012 | Lorey |
| 2012/0145875 A1 | 6/2012 | Haller et al. |
| 2012/0153689 A1 | 6/2012 | Haller et al. |
| 2012/0153695 A1 | 6/2012 | Haller et al. |
| 2013/0112839 A1 | 5/2013 | Kato et al. |
| 2013/0161138 A1 | 6/2013 | Barefoot |
| 2013/0341484 A1 | 12/2013 | Yamada et al. |
| 2014/0239684 A1 | 8/2014 | Mindel |
| 2014/0354027 A1 | 12/2014 | Kolb |
| 2014/0354030 A1 | 12/2014 | Kolb |
| 2015/0001771 A1 | 1/2015 | Lorey |
| 2015/0090549 A1 | 4/2015 | Haller |
| 2016/0059658 A1 | 3/2016 | Kuriki |
| 2017/0023086 A1 | 1/2017 | Ogawa |
| 2017/0037921 A1 | 2/2017 | Ogawa |

FOREIGN PATENT DOCUMENTS

| | | |
|---|---|---|
| CN | 203032435 | 7/2013 |
| DE | 1287453 | 1/1969 |
| DE | 2016973 | 10/1970 |
| DE | 2756624 | 6/1979 |
| DE | 2757661 | 6/1979 |
| DE | 141769 | 5/1980 |
| DE | 2059720 | 6/1980 |
| DE | 3517345 | 11/1986 |
| DE | 3517505 | 11/1986 |
| DE | 3831724 | 3/1990 |
| DE | 3930612 | 3/1991 |
| DE | 4029490 | 3/1992 |
| DE | 4037289 | 5/1992 |
| DE | 3686619 | 4/1993 |
| DE | 4216987 | 7/1993 |
| DE | 3785493 | 10/1993 |
| DE | 19938698 | 2/2001 |
| DE | 20116588 | 5/2002 |
| DE | 10306564 | 8/2004 |
| DE | 102004013308 | 12/2005 |
| DE | 102005040581 | 3/2006 |
| DE | 60116693 | 7/2006 |
| DE | 102005011856 | 8/2006 |
| DE | 102005048949 | 12/2006 |
| DE | 102006016140 | 10/2007 |
| DE | 102007039215 | 2/2009 |
| DE | 202007013300 | 2/2009 |
| DE | 102008016685 | 6/2009 |
| DE | 102008022046 | 7/2009 |
| DE | 102008020865 | 11/2009 |
| DE | 102008027474 | 12/2009 |
| DE | 102008050142 | 3/2010 |
| DE | 102008037547 | 5/2010 |
| DE | 102009022763 | 12/2010 |
| DE | 202011005606 | 12/2011 |
| DE | 102010033419 | 2/2012 |
| DE | 102010037842 | 3/2012 |
| DE | 102010051325 | 5/2012 |
| DE | 102010055342 | 6/2012 |
| DE | 102010055344 | 6/2012 |
| DE | 102011009530 | 7/2012 |
| DE | 102011100307 | 11/2012 |
| DE | 102011085879 | 5/2013 |
| EP | 0322608 | 7/1989 |
| EP | 1186467 | 3/2002 |
| EP | 1447589 | 8/2004 |
| EP | 1464866 | 10/2004 |
| EP | 1643155 | 4/2006 |
| EP | 2468568 | 4/2006 |
| EP | 2062758 | 5/2009 |
| EP | 2133576 | 12/2009 |
| EP | 2211072 | 7/2010 |
| EP | 2465725 | 6/2012 |
| EP | 2468567 | 6/2012 |
| FR | 1081491 | 12/1954 |
| FR | 1364719 | 6/2012 |
| GB | 1295410 | 11/1972 |
| JP | S62-18346 | 1/1987 |

(56) References Cited

FOREIGN PATENT DOCUMENTS

| JP | S62-18347 | 1/1987 |
|---|---|---|
| WO | WO 91/04168 | 4/1991 |
| WO | WO 94/22692 | 10/1994 |
| WO | WO 99/33676 | 7/1999 |

OTHER PUBLICATIONS

Official Action (no English translation available) for German Patent Application No. 102013104926.5 dated Apr. 2, 2014, 8 pages.
Official Action (no English translation available) for German Patent Application No. 102013110358.8 dated Feb. 6, 2014, 3 pages.
Extended European Search Report (no English translation available) for European Patent Application No. 14170683.8, dated Jan. 8, 2015, 6 pages.
Official Action (no English translation available) for German Patent Application No. 102013106709.3 dated Feb. 28, 2014, 5 pages.
Extended European Search Report (no English translation available) for European Patent Application No. 14173618.1 dated Nov. 19, 2014, 7 pages.
Extended European Search Report for European Patent Application No. 14180567.1, dated Feb. 19, 2015, 9 pages.
Official Action (no English translation available) for German Patent Application No. 102013110919.5, dated Jul. 7, 2014, 3 pages.
Official Action for U.S. Appl. No. 14/276,122, dated Mar. 27, 2015, 5 pages Restriction Requirement.
Notice of Allowance for U.S. Appl. No. 14/276,122, dated Jun. 17, 2015, 9 pages.
Official Action for U.S. Appl. No. 14/294,356, dated Jun. 8, 2015, 15 pages.
Official Action for U.S. Appl. No. 14/294,356, dated Sep. 24, 2015, 17 pages.
Notice of Allowance for U.S. Appl. No. 14/294,356, dated Nov. 30, 2015, 16 pages.
Official Action for U.S. Appl. No. 14/314,719, dated Sep. 30, 2015, 7 pages.
Official Action for U.S. Appl. No. 14/468,977, dated Jul. 21, 2015, 11 pages.
Official Action for U.S. Appl. No. 14/468,977, dated Dec. 4, 2015, 11 pages.
U.S. Appl. No. 15/025,969, filed Mar. 30, 2016, Haller.
U.S. Appl. No. 15/025,986, filed Mar. 30, 2016, Haller.
Notice of Allowance for U.S. Appl. No. 14/314,719, dated Mar. 30, 2016 5 pages.
Notice of Allowance for U.S. Appl. No. 14/468,977, dated Mar. 28, 2016 5 pages.
Official Action for U.S. Appl. No. 14/278,098, dated Sep. 9, 2016 10 pages.
Official Action for German Patent Application No. 102013021561.7, dated Oct. 29, 2014, 7 pages.
U.S. Appl. No. 14/915,754, filed Mar. 1, 2016, Haller.
Official Action (no translation) for CN Patent Application No. 201410784797.9, Jan. 4, 2017, 7 pages.
Official Action for U.S. Appl. No. 14/278,098, dated Mar. 3, 2017 9 pages.
Official Action for U.S. Appl. No. 14/915,754, dated Feb. 2, 2017, 10 pages.
Official Action for U.S. Appl. No. 15/025,986, dated Mar. 20, 2017, 7 pages, Restriction Requirement.
Official Action for U.S. Appl. No. 15/025,986, dated May 31, 2017 11 pages.

\* cited by examiner

VEHICLE SEAT HAVING A HORIZONTALLY MOVABLE SEATING SURFACE FOR RECEIVING A PERSON

CROSS-REFERENCE TO RELATED APPLICATIONS

This application claims the benefit of German Patent Application No. DE 10 2013 021 561.7 filed Dec. 16, 2013, the entire contents of which are incorporated herein by reference.

FIELD

The invention relates to a vehicle seat with a horizontally movable seating surface for receiving a person as well as to a method for controlling fluid systems of a horizontal and a vertical spring system of a vehicle seat.

BACKGROUND

A vehicle seat and method of this type are known, for example, from DE 10 2005 011 856 B3. Said document describes a vehicle seat with a horizontally movable seating surface for receiving a person, the vehicle seat having a retaining means which can be rigidly connected to a vehicle, and having a horizontal spring system as well as a vertical spring system, both the horizontal and the vertical spring systems being configured as fluid systems. In said document, air is used as the fluid, so that the fluid systems of the spring systems described therein are operated with compressed air. The vertical spring system of said document has in this respect a vertical pneumatic spring which is connected to a pneumatic spring of the horizontal spring system. The compressed air inside the vertical pneumatic spring of the vertical spring system thus serves as a supply source of compressed air for the pneumatic spring of the horizontal spring system so that the same pressure always prevails in the fluid systems of the horizontal and vertical spring systems due to a spontaneous pressure compensation.

A similar device is described in DE 10 2010 055 342 A1 arises from the applicant. The horizontal spring means described in detail in said document can also be used in the present invention, and therefore the full disclosure thereof is included in the content of the present document.

However, with respect to DE 10 2005 011 856 B3 it proves to be a problem that due to the direct fluid connection of the fluid systems of the vertical and horizontal spring systems therein, the same pressure prevails at all times as a result of the spontaneous pressure compensation due to the direct fluid connection in these fluid systems.

It is not always desirable, however, to have the same pressures in the fluid system of the vertical spring system and in the fluid system of the horizontal spring system.

SUMMARY

It is therefore the object of the invention to develop a vehicle seat according to the preamble of claim 1 and to develop a method according to the preamble of claim 9 such that it is possible to achieve different fluid pressures in the fluid systems of the vertical and horizontal spring systems, in which case a simple structural arrangement of the fluid systems is to be provided.

This object is achieved by a vehicle seat having all the features of claim 1 and by a method having all the features of claim 9. Advantageous configurations of the invention are set out in the subclaims.

The vehicle seat according to the invention comprising a horizontally movable seating surface for receiving a person has in this respect a retaining means, which can be rigidly connected to a vehicle, and a horizontal spring system as well as a vertical spring system, both the horizontal and the vertical spring systems being configured as fluid systems. The vehicle seat according to the invention is characterized in that the fluid systems of the horizontal and vertical spring systems are fed by a central fluid supply and the fluid system of the horizontal spring system is separated from the fluid system of the vertical spring system by at least one valve.

Due to the configuration according to the invention of the vehicle seat, it is now possible to provide a common central fluid supply for the fluid systems of the vertical and horizontal spring systems, but due to the arrangement of a valve, the two fluid systems of the horizontal and vertical spring systems can be separated from one another, thereby making it possible to achieve different pressures in the two fluid systems.

According to a first advantageous concept of the invention, the fluid systems of the spring systems are in this respect configured as pneumatic systems. This provides in particular the advantage that air can be used as the fluid. In this respect, the central fluid supply can also be adjusted by a simple compressor or by a central compressed air storage means having a controlled air feed valve for adjusting the pressure inside the fluid systems of the horizontal and vertical spring systems. The fluid system of the vertical spring system can in this respect be separated from the fluid system of the horizontal spring system by means of the at least one valve. The pressure in the fluid system of the vertical spring system can thus be adjusted, for example to the weight of the driver sitting on the seating surface, without this pressure being directly transferred to the fluid system of the horizontal spring system, because the two fluid systems can be separated from one another by the valve.

In this respect, the valve is advantageously configured as a non-return valve, so that excess pressure in the fluid system of the vertical spring system can be released via an exhaust air valve without the pressure in the fluid system of the horizontal spring system also changing simultaneously since there is not enough pressure therein to open the non-return valve against the pressure prevailing in the fluid system of the vertical spring system.

The compressed air supplied by the central fluid supply in this respect feeds the fluid systems of the horizontal and vertical spring systems with almost the same working pressure. In this respect, the spring characteristic of the fluid system of the horizontal spring system can be adapted to that of the vertical spring system and is thus initially adapted to the driver's weight in an initial situation before the start of the journey. Due to the arrangement of the valve, in particular of the non-return valve, between the two fluid systems, during dynamic operation the spring characteristic of the fluid system of the vertical spring system does not influence the spring characteristic of the fluid system of the horizontal spring system and vice versa.

According to a further advantageous concept of the invention, there is provided for the vertical spring system and for the horizontal spring system a respective pressure measuring means which can determine the pressures in the respective fluid systems. In this respect, it has proved to be advantageous that the pressures in the fluid systems of the vertical and horizontal spring systems can be adapted to one another using the pressure values determined by the pressure measuring means. On the one hand, this can mean that identical pressures can be set in the fluid systems. However, it is also possible to set different pressures in the fluid systems.

In this respect, the pressure measuring means are advantageously configured as position sensors for detecting the vertical and horizontal positions of the seating surface, a comparison and conversion means being provided, by means of which the position values of the position sensors can be converted into pressure values. As a result, it is easily possible to deduce the pressures in the fluid systems of the vertical and horizontal spring systems based on the position of the seating surface during operation of the vehicle seat.

It has further proved advantageous to provide a choke to reduce pressure. In an advantageous configuration of the invention, this choke is arranged inside the fluid system of the vertical spring system. As a result, it is easily possible to reduce the pressure in the fluid systems in a controlled and not abrupt manner, which meets the requirements particularly in terms of comfort.

According to a further particularly advantageous concept of the invention, at least three further valves are provided, by means of which it is possible to reduce the pressure in the fluid system of the horizontal spring system via the choke, this pressure reduction being uncoupled from the pressure reduction in the fluid system of the vertical spring system. This configuration of the invention makes it easily possible to reduce or adapt the pressures in the fluid systems of the vertical and horizontal spring systems separately and independently of one another, but only one choke has to be used to reduce the pressure.

Here as well, it has proved advantageous that these valves are configured as simple non-return valves which open on one direction, only when a specific pressure is exceeded.

The method according to the invention for controlling fluid systems of a horizontal and a vertical spring system of a vehicle seat is characterized in that the fluid which is required is removed from a common central fluid supply, it being possible to uncouple the fluid systems of the horizontal and vertical spring systems from one another by at least one non-return valve.

The method according to the invention easily ensures that the vehicle seat can be operated such that different pressures can be set in the fluid systems of the vertical and horizontal spring systems.

In this respect, it has proved further advantageous that the fluid pressure in fluid systems of a horizontal and a vertical spring system can be regulated by controlling inlet and outlet valves such that the seating surface can be moved into a predetermined, particularly into a pre-programmed position.

Further aims, advantages, features and possible uses of the present invention are revealed by the following description of embodiments on the basis of the drawings. In this respect, all described and/or illustrated features form, per se or in any reasonable combination, the subject matter of the present invention, even irrespective of their summary in the claims or of their back-referencing.

DETAILED DESCRIPTION

Figure 1:
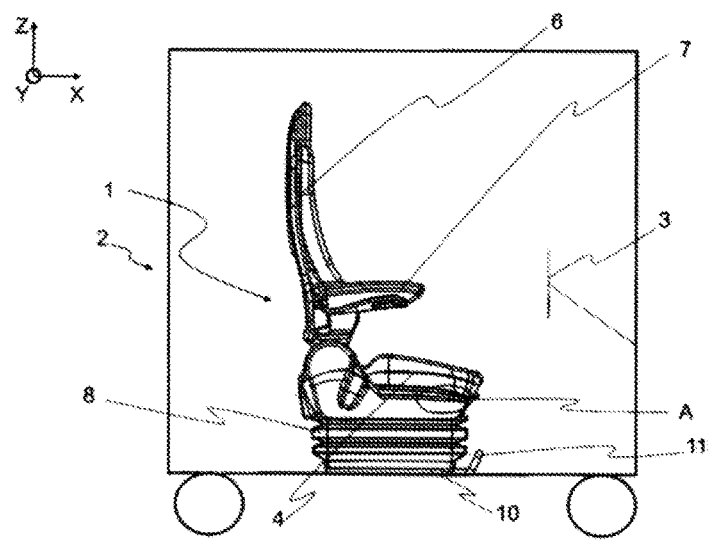
FIG. 1: is a schematic view of a vehicle comprising a vehicle seat.

FIG. 1 shows a vehicle seat 1 in a vehicle 2. The vehicle seat 1 is oriented in the longitudinal direction X of the vehicle and has a seating surface 4 extending in the width direction Y and length direction X of the vehicle as well as a backrest 6 which extends in the vertical direction Z of the vehicle which is preferably arranged so as to be pivotable relative to the seating surface 4. Reference sign 3 designates a steering wheel which can be operated by a person (not shown) sitting on the vehicle seat 1. Furthermore, one or two armrests 7 are preferably arranged on the vehicle seat 1, particularly on the backrest 6.

The seating surface 4 is preferably spaced apart from the upper side of the floor of the vehicle by a retaining region 8, the vehicle 2 and the vehicle seat 1 preferably being rigidly or occasionally movably interconnected via a coupling region 10. A movement of the seat 1 relative to the vehicle 2 can be, for example, a displacement, particularly in the longitudinal direction X of the vehicle, a handle 11 being able to influence or control a displacement of the seat. Reference sign A indicates a region in which a horizontal spring system 12 of the vehicle seat 1 is preferably arranged.

Figure 2:
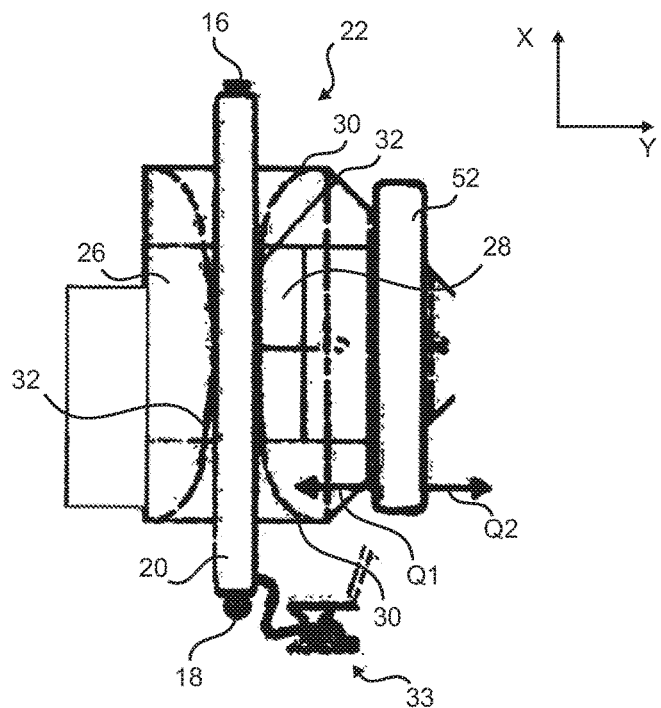
FIG. 2: is a view of a horizontal spring system.

FIG. 2 shows the basic concept of the horizontal spring system 12. Said spring system 12 has a deformation means 22 formed by two preferably mutually opposite contact elements 26, 28. The contact elements 26, 28 preferably have curved portions, in particular curved first contact surface portions 30 and lesser curved second contact surface portions 32, against which the fluid spring element 20 can temporarily or permanently rest. In the view shown in FIG. 2, the fluid spring element 20 is a pneumatic muscle 20 formed between two attachment regions 16, 18.

The fluid spring element 20 can be brought into contact with one or both of the contact elements 26, 28 as the result of a displacement of the deformation means 22. A displacement of the deformation means 22 in direction Q1 or Q2 is produced as the result of a relative movement between the upper part of the spring and the lower part of the spring, which is preferably rigidly coupled or respectively connected to the deformation means 22.

In the neutral position shown in FIG. 2, the fluid spring element 20 preferably rests against the entire second contact surface portion 32 of one and preferably of both contact elements 26, 28. Reference sign 33 generally indicates further seat components, such as the seating surface 4, the backrest 6 etc.

In this respect, the mode of operation of the horizontal spring system substantially corresponds to the one described for fluid spring elements in DE 10 2010 055 342 A1, the entire disclosure of which is included in the content of this document.

Figure 3:
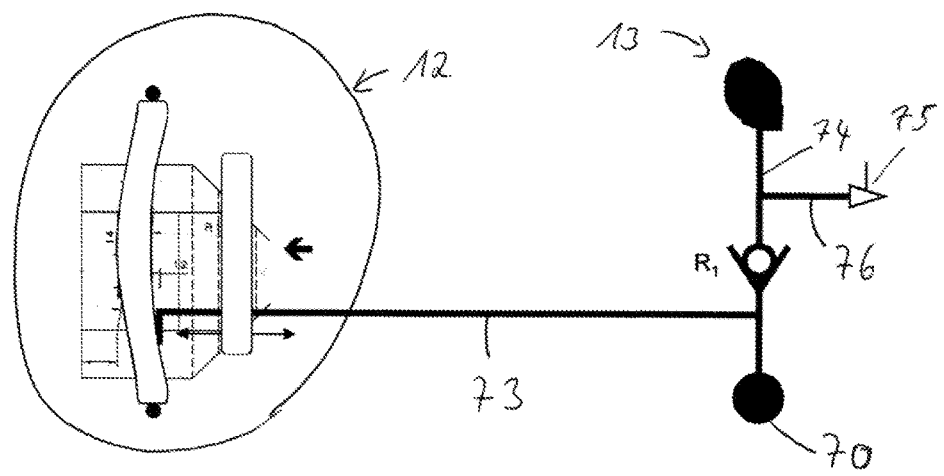
FIG. 3: shows a first embodiment of a fluid system of a vehicle seat according to the invention.

FIG. 3 shows a first embodiment of a fluid system of a vehicle seat 1 according to the invention. In this respect, the fluid system has a fluid supply 70 which can be configured, for example, as a compressed air storage means or as a compressor. A supply line 73 connects the fluid supply 70 to the fluid system of a horizontal spring system 12 and a supply line 74 connects the fluid supply to the fluid system of a vertical spring system 13. Also arranged in the supply line 74 of the fluid system of the vertical spring system 13 is a valve R1 in the form of a non-return valve which prevents compressed air from passing out of the fluid system of the vertical spring system 13 into the fluid system of the horizontal spring system 12 and thus prevents a pressure compensation. However, in this respect, the non-return valve R1 is configured such that, above a predetermined pressure at which the spring-loaded non-return valve R1 opens, compressed air can pass from the supply line 73 of the fluid system of the horizontal spring system 12 into the supply line 74 of the fluid system of the vertical spring system 13.

Branching off from the supply line 74 of the fluid system of the vertical spring system 13 is also an exhaust air line 76, at the end of which an exhaust air valve 75 is arranged to release pressure from the fluid system of the vertical spring system 13. To prevent an excessively high pressure in the fluid system of the vertical spring system 13, the exhaust air valve 76 can be opened in a targeted manner. In order that the pressure does not escape abruptly, a choke D1 (not shown in FIG. 3) can further be arranged downstream of the exhaust air valve 75, by which the pressure can be released in a targeted manner from the fluid system of the vertical spring system 13.

The central fluid supply 70 feeds the fluid systems of the vertical and horizontal spring systems 13 and 12 with almost the same working pressure. Consequently, the spring characteristic of the horizontal spring system 12 is adapted to that of the vertical spring system 13 and is thus initially adapted to the driver's weight on the seat in the starting situation before the vehicle departs. In this respect, in dynamic operation the spring characteristic of the vertical spring system does not influence the spring characteristic of the horizontal spring system 13 and vice versa.

Figure 5:
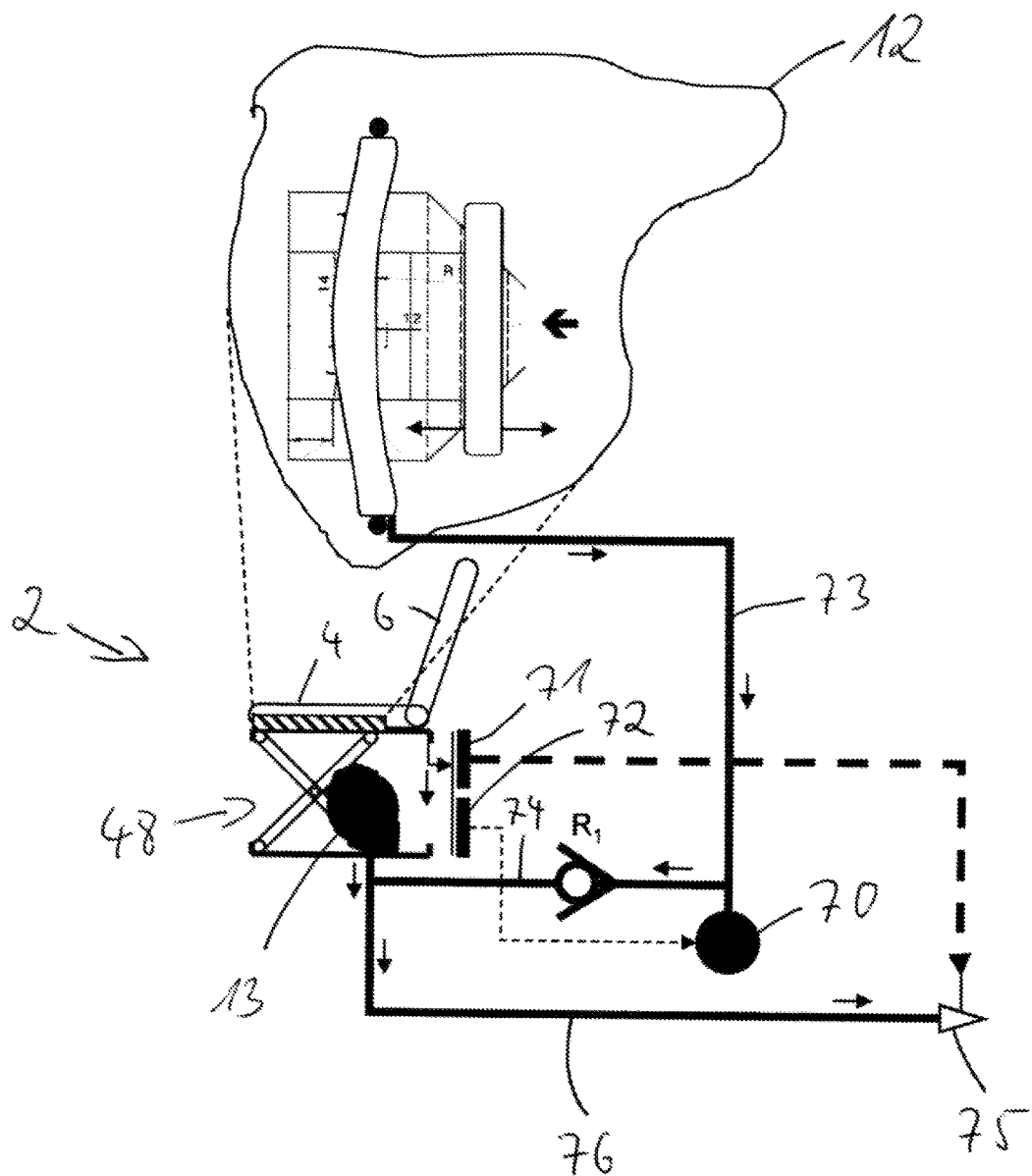
FIG. 5: shows the fluid system according to FIG. 3 during a ventilation procedure when the vehicle seat is occupied by a light person.
Figure 6:
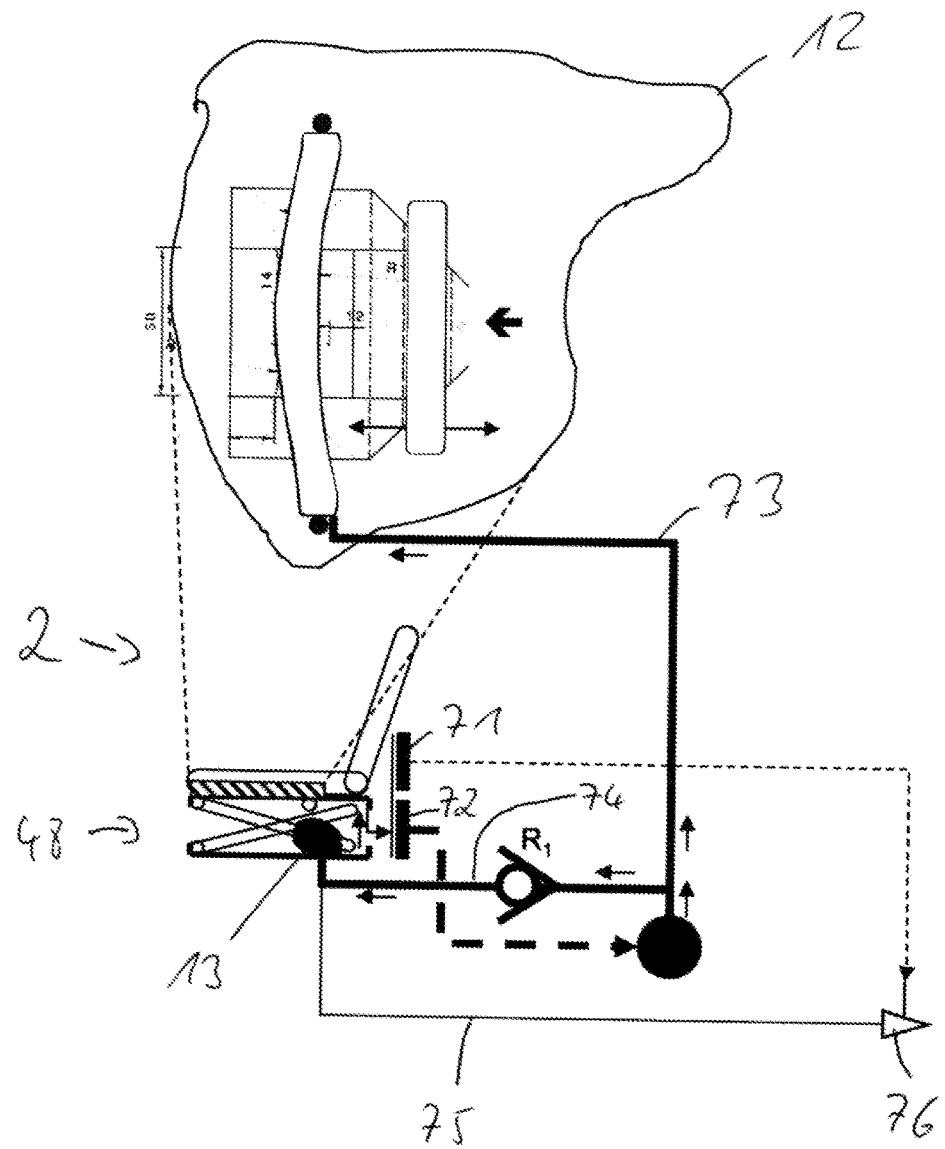
FIG. 6: shows the fluid system according to FIG. 3 during a ventilation procedure when the vehicle seat is occupied by a heavy person.

FIG. 5 shows the fluid system according to FIG. 3 during a ventilation procedure when a light person is sitting on the vehicle seat 2, while FIG. 6 shows the fluid system according to FIG. 3 during a ventilation procedure when a heavy person is sitting on the vehicle seat. These views show that when the pressure in the fluid system of the horizontal spring system 12 is greater than the pressure in the fluid system of the vertical spring system 13, pressure is reduced in the fluid system of the horizontal spring system 12 in that the non-return valve R1 opens and thus a pressure compensation can take place between the two fluid systems of the horizontal and vertical spring systems 12 and 13.

However, if the pressure in the fluid system of the vertical spring system 13 is greater than in the fluid system of the horizontal spring system 12, then due to the blocking effect thereof, no pressure compensation can take place via the non-return valve R1. Instead, excess pressure and thus compressed air is released via the exhaust air line 76 and the exhaust air valve 75.

To be able to compensate the pressure ratios in the fluid systems of the horizontal and vertical spring systems 12 and 13, two pressure measuring means 71 and 72 are provided which are configured as position sensors and are intended to determine the position and location of the seating surface both in the horizontal direction and in the vertical direction. Using a comparison and conversion means (not shown in the figures), the position values from the position sensors can be converted into pressure values, so that the exhaust valve 75 and the fluid supply 70 can be controlled accordingly to equalise the pressure, as shown in FIGS. 5 and 6 by the dashed lines.

Thus, according to FIG. 5, when a light person sits on the vehicle seat 2, the scissor frame 48 is only slightly compressed. The pressure measuring means 72 configured as a position sensor detects the slight displacement of the seating surface 4 in the vertical direction of the vehicle. Thereupon, it causes the fluid systems of the horizontal and vertical spring systems 12 and 13 to not be pressurised any further with compressed air by the fluid supply 70. Excess pressure in the fluid system of the horizontal spring system 12 is directed into the fluid system of the vertical spring system 13 via the supply lines 73 and 74 and via the non-return valve R1. Excess pressure in the fluid system of the vertical spring system 13 is released via the exhaust air line 76 and the exhaust air valve 75.

According to FIG. 6, when a heavy person sits on the vehicle seat 2, the scissor frame 48 is compressed to a greater extent. The pressure measuring means 72 configured as a position sensor detects the great displacement of the seating surface 4 in the vertical direction of the vehicle. Thereupon, it causes the fluid systems of the horizontal and vertical spring systems 12 and 13 to be pressurised further with compressed air by the fluid supply 70 until the pressure in the fluid systems of the horizontal and vertical spring systems has been adjusted according to the greater weight of the heavy person. In turn, this adjustment can be recognized by the pressure measuring means 71 and 72 configured as position sensors. As soon as a position of the seating surface 4 corresponding to the weight of the person sitting on the vehicle seat 2 has been reached, pressurisation is stopped. Pressure can now be compensated during operation as described with regard to FIG. 5.

Figure 4:
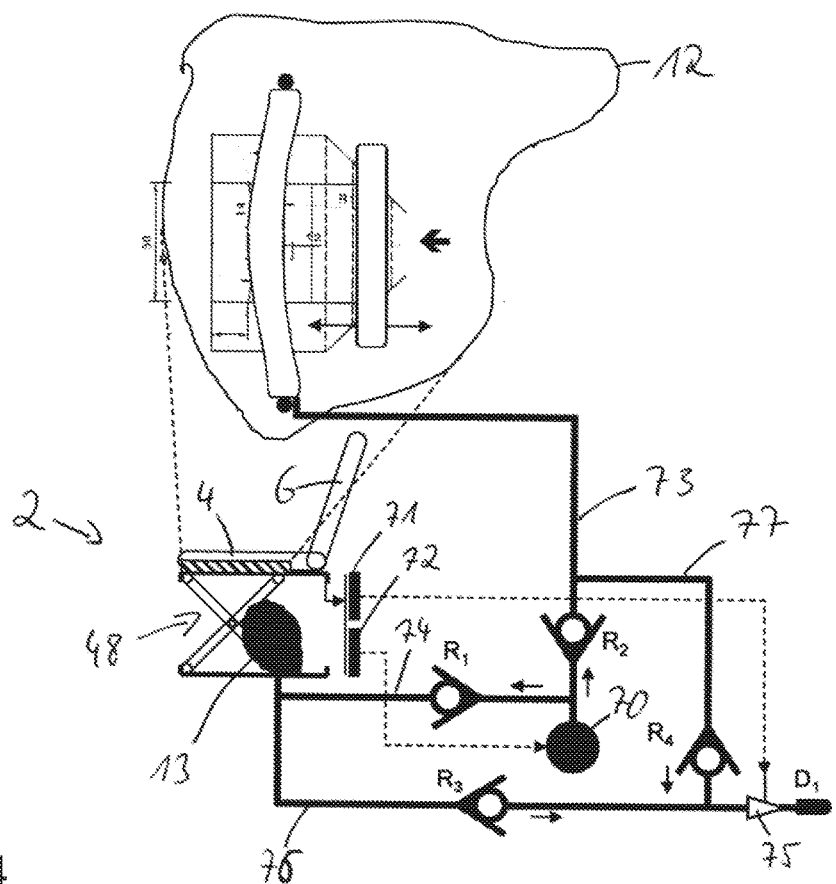
FIG. 4: shows a second embodiment of a fluid system of a vehicle seat according to the invention.

FIG. 4 shows a second embodiment of a fluid system of a vehicle seat 2 according to the invention. Unlike the embodiment of FIGS. 3, 5 and 6, in FIG. 4 three further valves R2, R3 and R4 are provided which are configured as non-return valves. In this respect, the non-return valve R2 is arranged in the supply line 73 of the fluid system of the horizontal spring system 12 such that there is no possibility of a transfer of fluid from the fluid system of the horizontal spring system 12 into that of the vertical spring system. In this respect, excess pressure in the fluid system of the horizontal spring system 12 is guided via an exhaust air line 77 to the exhaust air valve 75, downstream of which another choke D1 is arranged for a uniform pressure reduction.

In this embodiment, the non-return valve 1 in the supply line 74 of the fluid system of the vertical spring system 13 has the same function as the non-return valve R1 of the embodiment of FIGS. 3, 5 and 6. In particular, the non-return valve R1 prevents the excess pressure, generated by the deflection in the fluid system of the vertical spring system 13 from pushing air into the fluid system of the horizontal spring system 12.

By means of the two additional non-return valves R3 and R4 arranged in the exhaust air lines 76 and 77, the horizontal and vertical suspension systems 12 and 13 are completely separated from one another in their dynamics and the fluid system of the horizontal spring system 13 can be jointly ventilated during the weight adjustment.

The dynamic pressure generated by the ventilation choke D1 ensures in the ventilation procedure an almost synchronous pressure reduction in the now independent fluid systems of the horizontal and vertical spring systems 12 and 13.

LIST OF REFERENCE SIGNS 1 vehicle seat
2 vehicle
3 steering wheel
4 seating surface
6 backrests 7 armrest
8 retaining means
10 coupling region
11 handle
12 horizontal spring system
13 vertical spring system
16 first attachment region
18 second attachment region
20 fluid spring element
22 deformation means
26 first contact element
28 second contact element
30 first contact surface portions
32 second contact surface portions
33 seat components
48 scissor frame
70 fluid supply
71 pressure measuring means
72 pressure measuring means
73 supply line
74 supply line
75 exhaust air valve
76 exhaust air line
77 exhaust air line
A attachment region
D1 choke
L longitudinal direction
R1 valve
R2 valve
R3 valve
X longitudinal direction of vehicle and respectively seat
Y width direction of vehicle and respectively seat
Z vertical direction of vehicle and respectively seat

What is claimed is:

1. A vehicle seat with a horizontally movable seating surface for receiving a person, comprising:
    a retaining means which can be rigidly connected to a vehicle;
    a horizontal spring system configured as a fluid system connected to a central fluid supply via a first supply line; and
    a vertical spring system configured as a fluid system connected to the central fluid supply via a second supply line, wherein a non-return valve is positioned in the second supply line to limit fluid flow in one direction away from the central fluid supply, and the fluid system of the horizontal spring system is separated from the fluid system of the vertical spring system by the non-return valve.

2. The vehicle seat according to claim 1, wherein the fluid systems of the spring systems are configured as pneumatic systems.

3. The vehicle seat according to claim 1, wherein a respective pressure measuring means is provided for the vertical and the horizontal spring systems.

4. The vehicle seat according to claim 3, wherein the pressures in the fluid systems of the vertical and horizontal spring systems can be adapted to one another using the pressure values established by the pressure measuring means.

5. The vehicle seat according to claim 3, wherein the pressure measuring means are configured as position sensors for detecting the vertical and horizontal position of the seating surface, a comparison and conversion means being provided, by means of which the position values from the position sensors can be converted into pressure values.

6. The vehicle seat according to claim 1, wherein a choke is provided for reducing the pressure in the fluid system of the vertical spring system.

7. The vehicle seat according to claim 1, wherein further valves are provided, by means of which pressure can be reduced in the fluid system of the horizontal spring system via a choke, which pressure reduction is uncoupled from the pressure reduction in the fluid system of the vertical spring system.

8. The vehicle seat according to claim 1, wherein the non-return valve is configured to permit fluid flow from the central fluid supply and/or the fluid system of the horizontal spring system to the fluid system of the vertical spring system.

9. The vehicle seat according to claim 1, wherein an exhaust valve is positioned downstream of the fluid system of the horizontal spring system and the fluid system of the vertical spring system.

10. The vehicle seat according to claim 1, wherein excess pressure in the fluid system of the vertical spring system can be released via an exhaust air valve without the pressure in the fluid system of the horizontal spring system also changing simultaneously since there is not enough pressure in the fluid system of the horizontal spring system to open the non-return valve against the pressure in the fluid system of the vertical spring system.

11. The vehicle seat according to claim 1, further comprising:
    a non-return valve positioned in the first supply line to limit fluid flow in one direction away from the central fluid supply.

12. The vehicle seat according to claim 1, further comprising:
    a first exhaust line connected to the first supply line between the non-return valve and the vertical spring system and connected to an exhaust valve; and
    an exhaust non-return valve positioned in the first exhaust line to limit fluid flow in one directed away from the first supply line.

13. The vehicle seat according to claim 1, wherein the central fluid supply generates a fluid pressure in the first supply line and in the second supply line.

14. A method for controlling fluid systems of the horizontal and the vertical spring system of the vehicle seat according to claim 1, comprising:
    removing fluid from the central fluid supply, and
    uncoupling the fluid systems of the horizontal and vertical spring systems from one another by the non-return valve.

15. The method according to claim 14, further comprising:
    regulating the fluid pressure in fluid systems of a horizontal and a vertical spring system by controlling inlet and outlet valves such that the seating surface can be moved into a predetermined position.

16. The method according to claim 15, wherein the predetermined position is a pre-programmed position.

* * * * *